Aug. 21, 1962   J. F. P. PUGNIET   3,049,776
FASTENING DEVICES FOR RIBBONS AND THE LIKE
Filed May 27, 1958   2 Sheets-Sheet 2

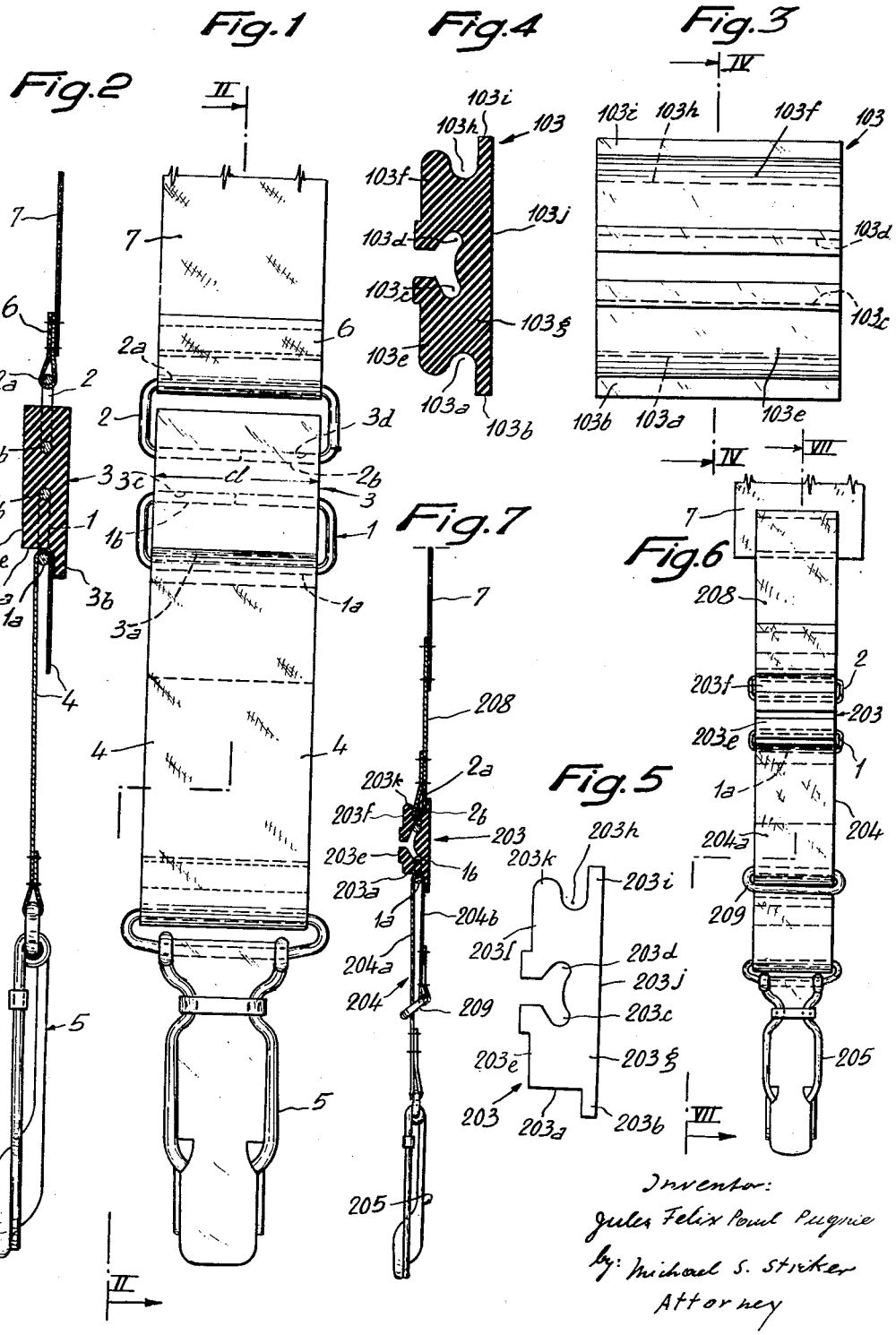

Inventor:
Jules Felix Paul Pugniet
by: Michael S. Striker
Attorney

United States Patent Office 3,049,776
Patented Aug. 21, 1962

3,049,776
FASTENING DEVICES FOR RIBBONS AND
THE LIKE
Jules Felix Paul Pugniet, 30 Ave. Alphand,
Saint-Mande, France
Filed May 27, 1958, Ser. No. 738,183
Claims priority, application France July 8, 1953
10 Claims. (Cl. 24—170)

The present invention relates to fastening devices in general, and more particularly to a device adapted for use as a connector between two or more ribbons, or for connecting one or more ribbons with an article of clothing. It is a continuation-in-part of my applications Nos. 441,588, filed July 6, 1954 now abandoned, and 642,731, filed February 27, 1957 now abandoned.

An object of the invention is to provide a fastening device which is of simple and lightweight construction, cheap in manufacture, reliable in use, and which may be made of readily available materials.

Another object of the present invention is to provide a fastening device for adjusting and/or releasably connecting one or more ribbons to each other or to an article of clothing.

A further object of the invention is to provide a device which may be utilized as a connector between a stocking suspender and a corset strap, girdle strap, or like articles.

An additional object of the invention is to provide a fastening device which may be utilized as a connector for and between ribbons of different widths.

A still further object of the invention is to provide a fastening device or connector of the above described character which may be readily taken apart for replacement or interchange of component parts.

A yet further object of the invention is to provide a fastening device for so connecting one or more ribbons as to permit sliding movements of one or more connected ribbons in the longitudinal direction thereof.

A concomitant object of the invention is to provide a fastening device of the above described characteristics which occupies little space and which may be conveniently concealed from view.

An additional object of the instant invention is to provide a fastening device which does not damage or subject to excessive wear the ribbons connected thereto because the retaining action is performed by a resilient element.

A more specific object of the invention is to provide a device for connecting a stocking suspender of any known design to a girdle or a corset.

A still further object of the invention is to provide a fastening device which forms part of a stocking suspender.

A yet further object of the present invention is to provide a fastening device which forms part of the button mount in a stocking suspender.

The above and many other objects of the invention are attained by the provision of a fastening device comprising essentially a substantially flat body member which is made at least partially of resilient rubber-like material formed with one or two elongated planular or curved edge face portions; retaining means corresponding in number to the number of edge face portions of the body member and each adapted to abut against or to be brought into close proximity of one of the edge face portions substantially the full length thereof; and mounting means for each retaining means so connecting the latter to the body member that each retaining means may perform movements into and out of retaining positions in which the retaining means abuts against or is in close proximity of the corresponding edge face portion of the body member substantially the full length thereof.

In this manner, one or more ribbons may be held and preferably clamped with a certain force between the retaining means and the adjacent edge face portion of the body member.

More particularly, the novel fastening device, in its elementary form, comprises a substantially flat body member made at least partly of resiliently deformable material having an end face, a planular or curved edge face portion forming part of the end face and extending the full length thereof, and an elongated receiving portion substantially parallel with and spaced from the edge face; a retaining member having an elongated retaining portion adapted to be moved toward and away from the body member's edge face portion; and mounting means preferably integral with the retaining portion and held in the receiving portion of the body member in such a way as to permit the aforementioned movements of the retaining portion into and out of retaining position. The portion of body member adjacent to its edge face portion being of resilient material, it bears against the retaining portion of said member and safely holds one or more ribbons therebetween, for example, a ribbon connected to the strap of a girdle or corset, or a ribbon connected to the stocking suspender, the ribbon connected thereto being removable and preferably adjustable in length by simply moving the retaining portion of said member out of its retaining position and, upon adjustment of the ribbon or ribbons, returning it back into retaining position.

The novel fastening device may be provided with two edge face portions at the opposing ends thereof and in such cases requires two retaining members or keepers, one for each edge face portion, which affords the additional advantage of permitting adjustments in length of ribbon or ribbons attached to the opposing ends of the body member. If desired, one of the ribbons may be permanently fastened to the keeper and the fastening device is then suspended on such permanently connected ribbon.

The length of body member between its edge face portion or portions and the point or points at which the keeper or keepers are connected thereto is so selected to preferably exceed the distance between the keeper's retaining and mounting portions whereby to resiliently retain one or more ribbons placed between its edge face portion or portions and the adjacent retaining portion of the cooperating keeper. Thus, when the body member is put to use, its portion adjacent to the keeper's retaining portion should preferably be at least slightly compressed to prevent displacements or eventual release of a ribbon.

As before stated, the edge face portion or portions of the body member may be planular or curved, in the latter case in the form of a recess or groove to receive the retaining portion of the keeper therein. The keeper is preferably held in a passage or bore which constitutes the receiving portion of the body member, and is usually free to pivot about the longitudinal axis of the passage.

To allow for convenient removal or replacement of a keeper, the passage or passages in the body member may communicate with an opening or cutout in a major surface of the body member. This is often desirable, for example, when a ribbon fastened to the keeper is not adjustable in length but should be removable, together with the keeper, from the body member. However, when the ribbon is of adjustable length, the retaining force between the suitably shaped edge face portion of the body member and the keeper's retaining portion should be sufficiently strong to prevent the ribbon from changing its position and consequently its length during attachment. If the body member carries two keepers, i.e. if it is formed with two edge face portions, the second keeper may be mounted in analogous manner, that is, it may be removably or permanently assembled with the body member depending whether it is permanently attached to a ribbon or should only retain a ribbon when its retaining portion abuts against the edge face portion of the body member.

Furthermore, one of the keepers with a ribbon permanently attached thereto may be permanently or removably connected with the body member without abutting against an edge face portion of the latter, while the other keeper adjustably and/or releasably holds another ribbon or band against the edge face portion of the body member.

The fastening device may be formed as part of the button mount of a stocking suspender, the button mount of resilient material being then formed with an edge face portion and carrying a keeper for pressing one or more ribbons against the edge face portion of the button mount. The customary buckle which, together with the button, releasably holds a stocking, may be connected directly with the keeper for pivotal movements thereabout. The edge face portion is then provided at that end of the button mount which is distant from the button, the keeper being pivotally held in a groove of the button mount whose axis is substantially parallel with the edge face portion so that the keeper is capable of performing swinging movements into engagement with and away from the edge face portion. In addition to permanently or longitudinally adjustably retaining a ribbon by means of which the keeper and thus the entire stocking suspender is connected to a corset, a girdle, or another article of underwear, the keeper may further adjustably retain a protecting ribbon whose function is to protect the wearer's leg against contact with the button mount and to preferably conceal the entire stocking suspender. Hence, the protecting ribbon, too, need not be permanently attached to the button mount but may be adjusted or removed at will without requiring additional fastening means therefore save for the fastening device inherently required for connecting the stocking suspender to a corset, a girdle, or the like.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is front elevational view of the fastening device shown as a connector between the ribbon of a stocking suspender and a corset strap;

FIG. 2 is a partly sectional and partly end elevational view as seen from line II—II of FIG. 1 in the direction of arrows;

FIG. 3 is front elevational view of a modified body member of resilient material forming part of the fastening device;

FIG. 4 is a transverse section taken on line IV—IV of FIG. 3, as seen in the direction of arrows;

FIG. 5 is side elevational view of a body member slightly different from that shown in FIGS. 3 and 4;

FIG. 6 is front elevational view of a fastening device somewhat different from the one shown in FIG. 1 which utilizes the body member of FIG. 5;

FIG. 7 is partly sectional and partly end elevational view as seen from line VII—VII of FIG. 6 in the direction of arrows;

Figure 8:
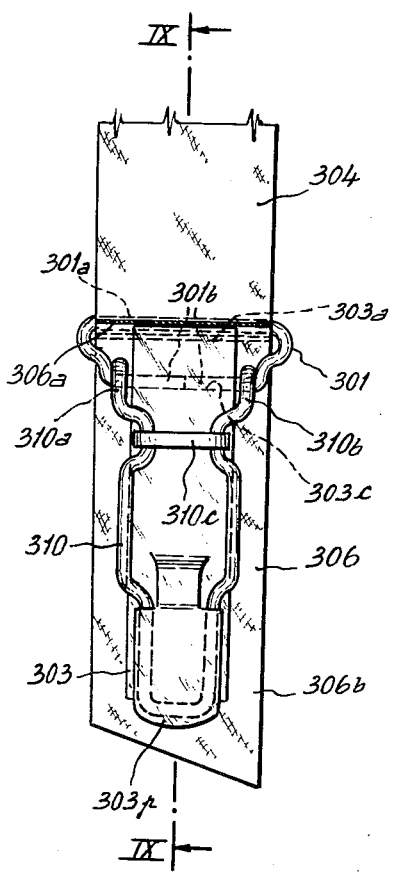
FIG. 8 is front elevational view of a stocking suspender embodying a button mount operating in the manner of body members shown in the preceding figures; the front portion of one of the ribbons being broken away for the sake of clarity.

Referring now in greater detail to the drawings, and first to FIGS. 1 and 2, the fastening device therein shown comprises two retaining means or keepers 1, 2 of rectangular contour having their sides 1b, 2b received in elongated passages or bores 3c, 3d, respectively, provided in and extending through a substantially flat body member 3 made of rubber or like elastically deformable material. Body member 3 is cut from suitable profiled stock and, in the embodiment of FIGS. 1 and 2, is of substantially rectangular contour.

The side 1a of keeper 1 is parallel with the side 1b received in passage 3c, its purpose being to support or clamp a ribbon 4 in such manner that the length of ribbon may be adjusted, if desired. The stocking suspender 5, schematically shown as connected to the lower end of ribbon 4, may be of the type disclosed in French Patent No. 1,002,093, applied for on July 25, 1946.

Side 2a of the other keeper 2 is received in a looped ribbon 6 which latter is sewn to the corset strap 7.

Sides 1b, 2b of keepers 1, 2, received in respective passages 1c, 1d of body member 3, are free to pivot therein, though keeper 2 could be rigidly held in the body member.

The portion of body member adjacent to the retaining portion or side 1a of keeper 1 is formed with an edge face 3a and with an abutment portion or stop 3b, the side 1a abutting against the edge face and preferably also against the stop 3b substantially the full length thereof to prevent displacements of ribbon 4 which is frictionally held therebetween. Edge face 3a is substantially parallel with the mounting means of keeper 1, that is, with its side 1b received in passage 3c of body member 3, and hence also with the longitudinal axis of said passage.

The width $d$ of body member 3 is less than the length of sides 1a and 2a of keepers 1, 2, respectively, and slightly less than the distance between the two shorter sides of the keepers. The length of body member's portion 3e between passage 3c and edge face 3a slightly exceeds the inner width of keeper 1, that is, the distance between its sides 1a, 1b. Therefore, the full-width portion of ribbon 4 which passes about and is in contact with side 1a of keeper 1, is rather strongly engaged and pressed against said side by the resilient body member 3. Thus, the keeper 1, with the exception of its side 1b, acts as a retaining means, its side 1a constituting an elongated retaining portion which clamps ribbon 4 against the edge face portion 3a and preferably at least partially against the stop 3b of the body member 3. The portion or side 1b of keeper 1, which is received in the passage 3c, serves as a mounting means for pivotally anchoring the retaining means or keeper 1 in the body member 3 for movements will respect to the latter into and out of retaining position. As above stated, when the keeper 1 is in such retaining position, its retaining portion or side 1a abuts at least against the edge face 3a, it being understood that the mounting thus afforded is a pivotal one enabling the keeper 1 to pivot about a pivot axis which extends through the receiving portion of the body member, the pivot axis coinciding with the axis of the keeper's side 1b.

Alternately, the entire keeper 1 may be constructed as a retaining member, in which case its side 1a constitutes an elongated retaining portion and its side 1b in the passage or receiving portion 3c of body member 3 a mounting portion.

The slightly modified body member 103 shown in FIGS. 3 and 4 is also made of profiled stock employing rubber or another resiliently deformable material. It comprises two hook-shaped, symmetrically disposed projections 103e, 103f extending from a common base 103g which extends the full length of the body member. Projection 103e defines a pair of recesses or grooves 103a, 103c, the other projection 103f being flanked by similar recesses 103h, 103d, respectively. Base 103g forms a pair of abutments or stops 103b, 103i adjacent to grooves 103a, 103h, respectively. Central grooves 103c, 103d are more distant from the continuous surface 103j of base 103g than the grooves 103a 103h. Since the grooves 103a, 103d form part of a single passage extending into that face of body member 103 which is susbtantially parallel with surface 103j, two keepers corresponding to members 1 and 2 of FIGS. 1, 2 may be inserted into said grooves without any deformation of the keepers. The distance between the longer sides of keepers similar to members 1, 2, when used with body member 103, is so selected as to be somewhat less than the distance between grooves 103a, 103c, and 103d, 103h, respectively. Thus, the body member 103 may act as a twin fastening device and may connect the keeper received in its recesses 103d, 103h directly with the corset strap 7, or with ribbon 6, in the latter case in such a way that only one end of ribbon 6 must be sewn to member 7.

The body member 203 illustrated in FIG. 5 is quite similar to that shown in FIGS. 3 and 4, with the exception that the groove 103a is omitted and replaced by an edge face 203a adjacent to stop 203b and capable of cooperating with a keeper in the manner analogous to that shown at the lower end of body member 3 in FIG. 2. The plane of edge face 203a is substantially perpendicular to the plane of continuous surface 203j.

The fastening device of FIGS. 6 and 7 adjustably connects the buckle of a stocking suspender 205 to the girdle strap 7. Suspender 205, which may be of the type described in the aforementioned French patent, is connected to strap 7 by means of a nonadjustable ribbon or band 203 and of an elastic ribbon 204 whose length is adjustable in the manner of ribbon 4 shown in FIGS. 1 and 2. The connection further comprises the body member 203, shown in greater detail in FIG. 5, and two keepers 1, 2 connecting respective ribbons 204, 208 to the body member. As before stated, body member 203 is made of elastically deformable material.

It can be best observed in FIG. 7 that the upper end of ribbon 208 is secured to the corset strap 7 by several stitching lines; its lower end forms a loop about the side 2a of keeper 2 and is bent over itself to be maintained in such position by a number of stitching lines. FIG. 7 further illustrates that the projection 203f of body member 203 extends through the keeper 2 so that the latter's sides 2b, 2a rest in respective grooves 203d, 203h. The distance between grooves 203d, 203h of the body member in unstressed condition can be less than, or may exceed, the distance between the keeper's sides 2a, 2b whereby the looped portion of ribbon 208 is either free to slide along the side 2a or is firmly retained between said side and the surface surrounding the body member's groove 203h. Assuming that the ribbon 208 is already connected to side 2a of keeper 2, the latter may be brought into the position of FIG. 7 by inserting side 2b into the groove 203d and pulling the ribbon in upward direction to force resilient projection 203f into and through the keeper. During such insertion, the keeper pivots about its side 2b while the other side 2a passes over the rib 203k at the upper end of projection 203f to be nested in groove 203h. Body member 203 being of elastically deformable material, rib 203k is readily deformed to permit the passage of side 2a thereover and to thereupon, together with abutment or stop 203i, retain the side 2a in groove 203h. Projection 203e is inserted into keeper 7 in the same manner as above described in connection with projection 203f and keeper 2. When the assembly of FIG. 7 is put to use, continuous surface 203j of base 203g is adjacent to the wearer's leg.

Elastic ribbon 204 forms a loop about the leg 1a of keeper 1.

The free end of its rear strand 204b carries a keeper 209 similar to members 1 and 2, through which the front strand 204a of the ribbon extends. The lower end of front strand 204a is connected to a member of stocking suspender 205. The width of keeper 209 is so selected that the front strand 204a of the ribbon remains free to pass therethrough without impediments, the ribbon itself being frictionally held between the side 1a of keeper 1 and the edge fame 203a of body member 203 in the manner analogous to that described in full detail in connection with FIGS. 1 and 2. Thus, the distance between groove 203c and edge face 203a exceeds the distance between sides 1a, 1b of keeper 1; therefore, in the position of FIG. 7, side 1a firmly engages and presses ribbon 204 against the edge face 203a. All tensile stresses conveyed by the stocking suspended 205 to girdle strap 7 are taken up by the front strand of ribbon 204.

The position of ribbon 204 with respect to the side 1a of keeper 1 determines the length of its front and rear strands 204a, 204b, respectively. Since the grooves 203c, 203d form part of an open passage in the body member 203, keepers 1 and 2 are insertable and/or removable at will even though they are sufficiently firmly held in their position of FIG. 7, especially keeper 1, to prevent sliding movements of ribbon 4 with respect to leg 1a.

It will be readily understood that the third keeper 209 may be omitted, if desired, since the combined retaining action of keeper 1 and body member 203 is sufficient to safely support the assembly 205 and a stocking connected thereto; or the keeper 209 may be replaced by any other suitable means if one desires to insure against accidental slipping of the ribbon were the front strand 204a subjected to excessive tensile stresses of such magnitude as to cause deformation of body member's projection 203e and to thus bring about removal of side 1b or 2b from the respective grooves 203c, 203d.

As will now be seen from the preceding description, the configuration of body members 3, 103 and 203, made of elastically deformable material, is such as to provide means for receiving and holding in position one side of one or two keepers; means for limiting the displacements, that is, relative movements of the other side of the keeper or keepers, these sides supporting the ribbon or ribbons; and, especially in cases of ribbons whose length is adjustable, means for compressing the ribbon over its entire width between the body member and the keeper or keepers.

Figure 9:
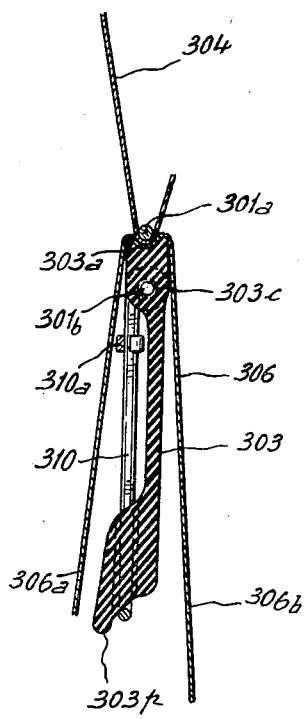
FIG. 9 is a transverse section taken on line IX—IX of FIG. 8, as seen in the direction of arrows.
Figure 10:
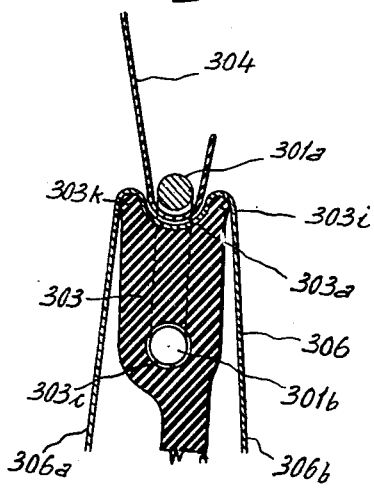
FIG. 10 is an enlarged detail view of the upper part of FIG. 9.

Referring now to FIGS. 8 to 10, the stocking suspender shown therein comprises body member 303 serving as a button mount carrying a stocking-engaging button 303p; a wire buckle 310 which holds the stocking on the button; and a looped keeper 301 having one side 301b received in the passage 303c of body member 303, said side further supporting the bent-over ends 310a, 310b of the buckle and forming a pivot for swinging movements of the buckle thereabout. A flat member 301c prevents with its bent-over ends lateral deformations of the buckle. The entire assembly is suspended on a preferably elastic ribbon 304.

When the stocking suspender is in use, the other side 301a of keeper 301 is received in transverse groove 303a in the upper end face of body member 303 which as stated above also serves as a button mount. Ribbon 304 is looped about side 301a and is preferably rather strongly pressed against the surface surrounding the groove 303a. Side 301a also presses the median portion of a protecting ribbon 306 against the body member or button mount 303, said protecting ribbon having a front strand 306a and a rear strand 306b. The latter acts as a protecting between the body member 303 and the wearer's leg, while the front strand 306a serves to conceal the buckle from view.

To prevent the slippage of ribbons 304 and 306 between side 301a and body member 303, it is sufficient that the combined thicknesses of said ribbons and the length of body member between passage 303c and groove 303a exceed the distance between sides 301a and 301b of the keeper. Due to elasticity of member 303, the ribbons are safely held in groove 303a.

The body member may be of any suitable design and may be pivotally connected with the loop member or keeper 301 in a number of ways, for example, as disclosed in French Patent No. 730,444 applied for on May 10, 1932, or in the aforementioned French Patent No. 1,002,093. Of course, in order to render the devices disclosed in said patents suitable for use in accordance with the present invention, their upper ends must be extended and provided with passages and grooves as above described in connection with member 303.

When one desires to fasten ribbons 304 and 306 to the body member 303, keeper 301 is first pivoted from its position shown in FIGS. 8 to 10 through an angle sufficient to permit insertion of ribbon 306 therethrough, ribbon 304 being assumed to have already been looped about side 301a. Keeper 301 is then returned into its position shown in the drawings and during such return movement, must pass over one of the ribs 303i, 303k adjacent to the groove 303a, the ribs being deformed and thereupon returning into the position of FIGS. 9 and 10 to flank side 301a when the latter rests in its groove 303a. Thus, without any sewing, with the possible exception of that necessary to fasten ribbon 304 to a belt or corset, there can be no displacement between the suspender assembly 301, 303, 310 on the one hand, and the ribbon 304 on the other hand, the ribbon being prevented from sliding by the resiliency of body member 303. Moreover, the length of said ribbon may be adjusted at will by varying the length of its strands before the side 301a of the keeper is received in groove 303a.

The ribbons 304, 306 may be removed at will, it being merely necessary to force side 301 over one of the ribs 303i, 303k whereupon the ribbons may either be adjusted or completely removed, if desired. Furthermore, the length of portion of member 303 between its passage 303c and groove 303a is so selected that ribbon 304 alone is securely held against the keepers' side 301a if the protecting ribbon 306 is removed since the latter's thickness is rather negligible. In addition, as the protecting member 306 is attached only to the top of body member 303, it does not interfere with manipulation of buckle 310 or button 303p when a stocking is attached to, or removed from, the latter, in contrast to stocking suspenders of known design in which the protecting ribbon is normally fastened to the suspender by sewing.

It is equally within the scope of the present invention to utilize stocking suspenders different from that shown in FIGS. 8 to 10, for example, without the buckle 310 of buttonhole shape, it being understood, however, that the resilient member corresponding to body member 33 be secured to a ribbon by means of a keeper in the manner as above described.

It will be understood that each of the elements described above, or two or more together, may also find a useful application in other types of fastening devices differing from the types described above.

Without further analysis, the foregoing will so fully reveal the gist of the present invention that others can by applying current knowledge readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A fastening device for an article of clothing comprising, in combination, a substantially flat body member formed from elastically deformable material and having an elongated edge face portion; retaining means having an elongated retaining portion adapted to abut against said edge face portion of said body member substantially along the entire length thereof; mounting means for mounting said retaining means on said body member for turning movement about a fixed axis transversely spaced from said elongated retaining portion into and out of a retaining position wherein said retaining portion of said retaining means abuts against said edge face portion of said body member substantially along the entire length thereof, the distance between said axis and said edge face portion being when said retaining means is turned out of its retaining position, greater than the distance between said axis and said elongated retaining portion so that when said retaining means is turned about said axis to said retaining position, the portion of the body member between said axis and said edge face portion will be compressed and the edge face resiliently pressed against said elongated retaining portion, whereby at least one ribbon or the like may be clamped between said portions when said retaining means is in its retaining position; and button means carried by said body member at a point distant from said mounting means, said body member serving also as the button mount of a stocking suspender.

2. The fastening device according to claim 1, wherein said edge face portion defines an elongated groove for receiving the retaining portion of said retaining means.

3. The fastening device according to claim 1, further comprising buckle means pivotally connected with said mounting means and comprising a receiving portion for said button means whereby said buckle means and said button means may engage and retain a stocking therebetween when the button means is received in the receiving portion of said buckle means.

4. The fastening device according to claim 1, wherein said retaining means is a loop and said mounting means constitutes one side of said loop anchored in said body member, said retaining portion constituting another side of said loop and exceeding in length the length of the edge face portion of said body member.

5. A fastening device comprising, in combination, a substantially flat body member having opposite faces, a resilient elongated edge face portion, an elongated receiving portion parallel to said edge face portion, and an elongated passage portion parallel to said receiving portion and extending between the same and one of said opposite faces; and a retaining member having an elongated retaining portion adapted to abut against said edge face portion of said body member substantially along the entire length thereof and an elongated mounting portion parallel to said retaining portion and adapted to be introduced through said passage portion into said receiving portion and be received thereby in such a manner that said retaining member is pivotable relative to said body member about a pivot axis, said retaining member being shaped so that when said mounting portion thereof is received by said receiving portion said retaining member is pivotable about said pivot axis into and out of a retaining position wheren said retaining portion abuts against said edge face portion substantially along the entire length thereof, whereby when a ribbon or the like is positioned between said edge face portion and said retaining portion while said retaining member is in its retaining position, said edge face portion will be deformed and resiliently press the ribbon or the like against said retaining portion, thereby clamping the ribbon or the like between said edge face portion and said retaining portion.

6. A fastening device as defined in claim 5 wherein said edge face portion is formed with an abutment portion adapted to be engaged by said retaining portion of said retaining member when the latter is in its retaining position.

7. A fastening device comprising, in combination, a substantially flat body member having opposite resilient elongated edge face portions and a receiving portion; a first retaining member having a first elongated retaining portion adapted to abut against one of said edge face portions of said body member substantially along the entire length thereof and a first mounting portion adapted to be received by said receiving portion of said body member in such a manner that said first retaining member is movable relative to said body member, said first retaining member being shaped so that when said first mounting portion thereof is received by said receiving portion, said first retaining member is movable into and out of a retaining position wherein said first retaining portion abuts against said one edge face portion substantially along the entire length thereof, whereby when a ribbon or the like is positioned between said one edge face portion and said first retaining portion while said first retaining member is in its retaining position, said one edge face portion will be deformed and resiliently press the ribbon or the like against said first retaining portion, thereby clamping the ribbon or the like between said one edge face portion and said first retaining portion; and a second retaining member having a second elongated retaining portion adapted to abut against the other of said edge face portions of said body member substantially along the entire length thereof and a second mounting portion adapted to be received by said receiving portion of said body member in such a manner that said second retaining member is movable relative to said body member, said second retaining member being shaped so that when said second mounting portion thereof is received by said receiving portion, said second retaining member is movable into and out of retaining position wherein said second retaining portion abuts against said other edge face portion substantially along the entire length thereof, whereby when another ribbon or the like is positioned between said other edge face portion and said second retaining portion while said second retaining member is in its retaining position, said other edge face portion will be deformed and resiliently press the other ribbon or the like against said second retaining portion, thereby clamping the other ribbon or the like between said other edge face portion and said second retaining portion.

8. A fastening device comprising, in combination, a substantially flat body member having opposite faces, opposite resilient elongated edge face portions, an elongated receiving portion parallel to said edge face portions, and an elongated passage portion parallel to said receiving portion and extending between the same and one of said opposite faces; a first retaining member having a first elongated retaining portion adapted to abut against one of said edge face portions of said body member substantially along the entire length thereof and an elongated first mounting portion parallel to said first retaining portion and adapted to be introduced through said passage portion into said receiving portion and be received thereby in such a manner that said first retaining member is pivotable relative to said body member about a first pivot axis, said first retaining member being shaped so that when said first mounting portion thereof is received by said receiving portion, said first retaining member is pivotable about said first pivot axis into and out of a retaining position wherein said first retaining portion abuts against said one edge face portion substantially along the entire length thereof, whereby when a ribbon or the like is positioned between said one edge face portion and said first retaining portion while said first retaining member is in its retaining position, said one edge face portion will be deformed and resiliently press the ribbon or the like against said first retaining portion, thereby clamping the ribbon or the like between said one edge face portion and said first retaining portion; and a second retaining member having a second elongated retaining portion adapted to abut against the other of said edge face portions of said body member substantially along the entire length thereof and an elongated second mounting portion parallel to said second retaining portion and adapted to be introduced through said passage portion into said receiving portion and be received thereby in such a manner that said second retaining member is pivotable relative to said body member about a second pivot axis, said second retaining member being shaped so that when said second mounting portion thereof is received by said receiving portion, said second retaining member is pivotable about said second pivot axis into and out of a retaining position wherein said second retaining portion abuts against said other edge face portion substantially along the entire length thereof, whereby when another ribbon or the like is positioned between said other edge face portion and second retaining portion while said second retaining member is in its retaining position, said other edge face portion will be deformed and resiliently press the other ribbon or the like against said second retaining portion, thereby clamping the other ribbon or the like between said other edge face portion and said second retaining portion.

9. A fastening device comprising, in combination, a substantially flat body member having opposite elongated edge face portions at least one of which is resilient and a receiving portion; a first retaining member having a first elongated retaining portion adapted to abut against said one edge face portion of said body member substantially along the entire length thereof and a first mounting portion adapted to be received by said receiving portion of said body member in such a manner that said first retaining member is movable relative to said body member, said first retaining member being shaped so that when said first mounting portion thereof is received by said receiving portion, said first retaining member is movable into and out of a retaining position wherein said first retaining portion abuts against said one edge face portion substantially along the entire length thereof, whereby when a ribbon or the like is positioned between said one edge face portion and said first retaining portion while said first retaining member is in its retaining position, said one edge face portion will be deformed and resiliently press the ribbon or the like against said first retaining portion, thereby clamping the ribbon or the like between said one edge face portion and said first retaining portion; and a second retaining member having a second elongated retaining portion and a second mounting portion adapted to be received by said receiving portion of said body member in such a manner that said second retaining member is movable relative to said body member, said second retaining member being shaped so that when said second mounting portion thereof is received by said receiving portion, said second retaining member is movable into and out of a retaining position wherein said second retaining portion is near but spaced from and substantially parallel to the other of said edge face portions substantially along the entire length thereof, whereby another ribbon or the like may be freely looped about said second retaining portion while said second retaining member is in its retaining position.

10. A fastening device for an article of clothing comprising, in combination, a substantially flat body member formed from elastically deformable material and having an elongated edge face portion; retaining means having an elongated retaining portion adapted to abut against said edge face portion of said body member substantially along the entire length thereof; mounting means for mounting said retaining means on said body member for turning movement about a fixed axis transversely spaced from said elongated retaining portion into and out of a retaining position wherein said retaining portion of said retaining means abuts against said edge face portion of said body member substantially along the entire length thereof, the distance between said axis and said edge face portion being, when said retaining means is turned out of its retaining position, greater than the distance between said axis and said elongated retaining portion so that when said retaining means is turned about said axis to said retaining position, the portion of the body member between said axis and said edge face portion will be compressed and the edge face resiliently pressed against said elongated retaining portion, whereby a ribbon or the like may be clamped between said portions when said retaining means is in its retaining position.

(References on following page)

References Cited in the file of this patent

UNITED STATES PATENTS

| | | |
|---|---|---|
| 923,575 | Planett | June 1, 1909 |
| 960,333 | Jennings | June 7, 1910 |
| 965,935 | Pumphrey | Aug. 2, 1910 |
| 1,021,088 | Brown | Mar. 26, 1912 |
| 1,261,027 | Hohmann | Apr. 2, 1918 |
| 1,392,241 | Woods | Sept. 27, 1921 |
| 1,767,451 | Hedge | June 24, 1930 |
| 1,848,722 | Jacobs | Mar. 8, 1932 |
| 2,258,605 | Garth | Oct. 14, 1941 |
| 2,641,039 | Bissell | June 9, 1953 |
| 2,797,465 | Kuchler | July 2, 1957 |